US012436703B2

(12) United States Patent
Hardy et al.

(10) Patent No.: US 12,436,703 B2
(45) Date of Patent: Oct. 7, 2025

(54) DETERMINING TO MIGRATE DATA BETWEEN COMPRESSED STORAGE DEVICES AND NON-COMPRESSED STORAGE DEVICES IN A STORAGE SYSTEM

(71) Applicant: INTERNATIONAL BUSINESS MACHINES CORPORATION, Armonk, NY (US)

(72) Inventors: Clint A. Hardy, Tucson, AZ (US); Matthew G. Borlick, Tucson, AZ (US); Beth Ann Peterson, Tucson, AZ (US); Lokesh Mohan Gupta, Tucson, AZ (US); Karl Allen Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/480,834

(22) Filed: Oct. 4, 2023

(65) Prior Publication Data
US 2025/0117149 A1 Apr. 10, 2025

(51) Int. Cl.
G06F 3/06 (2006.01)
(52) U.S. Cl.
CPC .......... *G06F 3/0647* (2013.01); *G06F 3/0604* (2013.01); *G06F 3/0683* (2013.01)
(58) Field of Classification Search
CPC ..... G06F 3/0647; G06F 3/0604; G06F 3/0683
See application file for complete search history.

(56) References Cited

U.S. PATENT DOCUMENTS 5,237,460 A * 8/1993 Miller .................... G06F 3/064
360/48
5,893,139 A * 4/1999 Kamiyama ............ G06F 12/08
711/134

(Continued)

FOREIGN PATENT DOCUMENTS

EP 0720085 A2 7/1996

OTHER PUBLICATIONS

"Partial Chip Access with Data Compression for Energy Saving and Performance Improvement," IP.com, IP.com No. IPCOM000266717D, Aug. 12, 2021, 16 pp.

(Continued)

*Primary Examiner* — Eric T Loonan
(74) *Attorney, Agent, or Firm* — Konrad, Raynes, Davda & Victor LLP; David Victor

(57) ABSTRACT

Provided are a computer program product, system, and method for determining to migrate data between compressed storage devices and non-compressed storage devices in a storage system. The storage system provides compressed storage devices having native data compression and a non-compressed storage devices not configured to have native compression. A determination is made of storage usage factors for the compressed storage devices and the non-compressed storage devices. A determination is made whether to move data between the compressed storage devices and the non-compressed storage devices based on the storage usage factors. Data is moved between the compressed storage devices and the non-compressed storage devices in response to determining to move the data between the compressed storage devices and the non-compressed storage devices.

23 Claims, 8 Drawing Sheets

(56) References Cited

U.S. PATENT DOCUMENTS

| | | | |
|---|---|---|---|
| 9,965,394 B2 | 5/2018 | Romanovskiy | |
| 10,481,806 B2 | 11/2019 | Mehrotra et al. | |
| 10,586,007 B1 | 3/2020 | Bigman | |
| 10,810,054 B1* | 10/2020 | Martinez Lerin | G06F 3/067 |
| 10,860,257 B2 | 12/2020 | Sakurada et al. | |
| 11,561,695 B1 | 1/2023 | Guyer | |
| 2007/0196101 A1* | 8/2007 | Maeda | H04N 1/2112 |
| | | | 396/439 |
| 2014/0317340 A1* | 10/2014 | Nishina | G06F 3/0644 |
| | | | 711/103 |
| 2016/0259565 A1* | 9/2016 | Hendry | G06F 3/064 |
| 2016/0291876 A1* | 10/2016 | Alatorre | G06F 3/0685 |
| 2017/0039000 A1* | 2/2017 | Feng | G06F 3/0638 |
| 2017/0090775 A1 | 3/2017 | Kowles | |
| 2020/0192571 A1 | 6/2020 | Thrane et al. | |
| 2021/0103399 A1* | 4/2021 | Lyu | G06F 3/0673 |
| 2021/0117132 A1 | 4/2021 | Vankamamidi et al. | |
| 2023/0418468 A1 | 12/2023 | Shah et al. | |

OTHER PUBLICATIONS

Pawar, et al., "Method to Achieve Significant Storage Efficiency without Affecting Performance," IP.com, IP.com No. IPCOM000266565D, IJul. 29, 2021, 4 pp.

U.S. Appl. No. 18/480,843 filed Oct. 4, 2023, P202205206US01 (137.0039).

List of Patents or Patent Applications Treated as Related, 2 pp., dated Oct. 4, 2023.

United States Non-Final Rejection dated Jan. 16, 2025, 16 pages, U.S. Appl. No. 18/480,843.

* cited by examiner

| 202 | 204 | 206 | 208 | 210 | 212 |
|---|---|---|---|---|---|
| Storage Device Type (Compressed v. Uncompressed) | Storage Devices | Current Available Storage Capacity | Prior Interval Available Storage Capacity | Rate of Storage Capacity Consumption | Time to Deplete Storage Capacity |

Storage Device Type Information

FIG. 2

| 302 | 304 | 306 | 308 | 310 |
|---|---|---|---|---|
| Extent ID | I/O Statistics | Volume I/O Priority | Compression Score | Storage Device Type |

Extent Information

FIG. 3

DETERMINING TO MIGRATE DATA BETWEEN COMPRESSED STORAGE DEVICES AND NON-COMPRESSED STORAGE DEVICES IN A STORAGE SYSTEM

BACKGROUND OF THE INVENTION

1. Field of the Invention

The present invention relates to a computer program product, system, and method for determining to migrate data between compressed storage devices and non-compressed storage devices in a storage system.

2. Description of the Related Art

A storage system consists of numerous storage devices configured in an array to represent a single combined storage space, such as a group of numerous storage devices in a Redundant Array of Independent Disks (RAID) array or a Just a Bunch of Disks (JBOD) array. A storage system may be comprised of heterogeneous storage devices having different capabilities. An enterprise storage system that supports heterogeneous storage drives of different capabilities can select among the drives to store data to optimize for bandwidth and latency.

SUMMARY

Provided are a computer program product, system, and method for determining to migrate data between compressed storage devices and non-compressed storage devices in a storage system. The storage system provides compressed storage devices having native data compression and a non-compressed storage devices not configured to have native compression. A determination is made of storage usage factors for the compressed storage devices and the non-compressed storage devices. A determination is made whether to move data between the compressed storage devices and the non-compressed storage devices based on the storage usage factors. Data is moved between the compressed storage devices and the non-compressed storage devices in response to determining to move the data between the compressed storage devices and the non-compressed storage devices.

BRIEF DESCRIPTION OF THE DRAWINGS

FIG. 2 illustrates an embodiment of storage device type information.

FIG. 3 illustrates an embodiment of extent information on an extent.

DETAILED DESCRIPTION

A storage system comprised of an array of storage devices may have storage devices implementing different native compression algorithms to provide different compression ratios. Further, the storage pool of storage devices to use to store data may be comprised of storage devices that have compression capability and other storage devices that do not offer compression.

Described embodiments provide improvements to computer technology to determine whether to migrate data between different types of storage devices, such as compressed and non-compressed storage devices. Described embodiments may consider usage factors, such as time to deplete available storage capacity, to determine the direction to migrate data between compressed storage devices and non-compressed storage devices. This migration allows optimization of storage by migrating data from overutilized storage device types to underutilized storage device types to provide for load balancing of the storage of data among the different types of storage devices.

Figure 1:
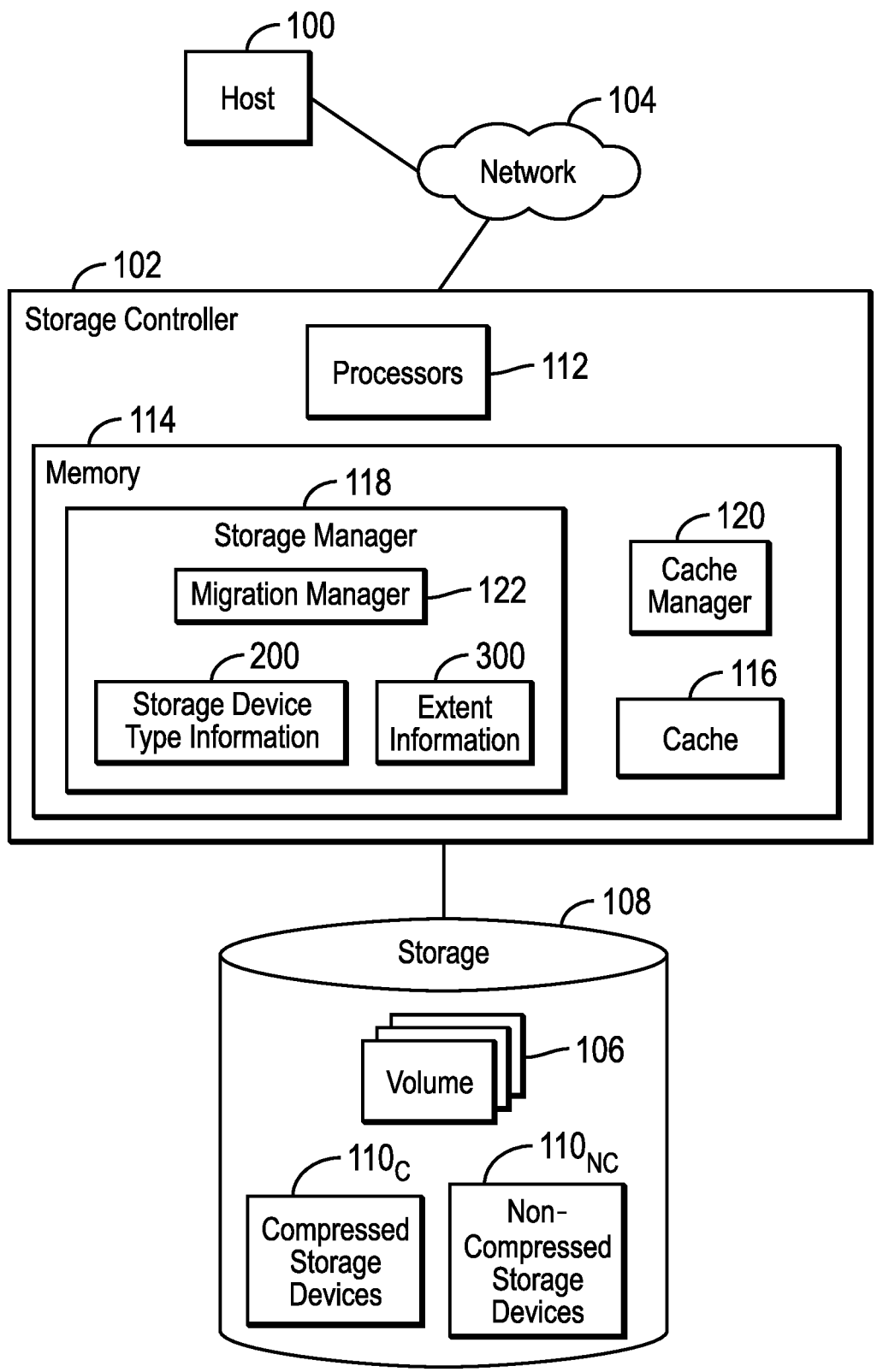
FIG. 1 illustrates an embodiment of a storage environment.

FIG. 1 illustrates an embodiment of a storage environment. A host 100, which may be one of a plurality of hosts, may submit Input/Output (I/O) requests to a storage controller 102 over a network 104 to access data at volumes 106 (e.g., Logical Unit Numbers, Logical Devices, Logical Subsystems, etc.) in a storage 108. The volumes 106 may be stored across a plurality of storage devices, including compressed storage devices $110_C$ and non-compressed storage devices $110_{NC}$ arranged in a Redundant Array of Independent Disks (RAID) or Just a Bunch of Disk (JBOD) configuration. Compressed storage devices $110_C$ implement native compression within the controllers of the storage device and non-compressed storage devices $110_{NC}$ do not implement native compression.

In an array configuration, such as a RAID array, the compressed storage devices $110_C$ and the non-compressed storage devices $110_{NC}$ may be separately organized into separate compressed storage ranks and non-compressed storage ranks, respectively. A rank consists of a set of physical storages that are grouped to form a logically contiguous storage space. In RAID, the data is striped across the array of non-compressed or compressed storage devices in the rank. The capacity of the rank may be divided in equal sized portions, called extents. Data in the volumes 106 may be organized in extents of data, where an extent comprises a range of tracks in the volume 106. An extent as that term is used herein may refer to a partition of data in a logical volume 106 or any other grouping of data in a volume or any other storage unit. In alternative embodiments, such as a JBOD embodiments, the storage devices may be organized into different arrays of compressed arrays of compressed storage devices $110_C$ and non-compressed arrays of non-compressed storage devices $110_{NC}$.

The storage controller 102 includes one or more processors 112 and a memory 114, including a cache 116 to cache data for the storage 108. The processors 112 may comprise a separate central processing unit (CPU), one or a group of multiple cores on a single CPU, or a group of processing resources on one or more CPUs. The cache 116 buffers data transferred between the host 100 and volumes 106 in the storage 108.

The memory 114 further includes a storage manager 118 to manage the transfer of tracks between the host 100 and the storage 108 and a cache manager 120 that manages data transferred between host 100 and the storage 108 in the cache 116. A track may comprise any unit of data configured in the storage 108, such as a track, Logical Block Address (LBA), storage cell, group of cells (e.g., column, row or array of cells), sector, segment, etc., which may be part of a larger grouping of tracks, such as a volume, logical device, etc. An extent may comprise any grouping of tracks.

In certain implementations, the storage manager 118 includes a migration manager 122 to determine whether to migrate data between the compressed storage devices $110_C$ and the non-compressed storage devices $110_{NC}$. The migration manager 122 may determine whether to store an extent on compressed storage devices $110_C$ or non-compressed storage devices $110_{NC}$ based on attributes of the data in the extent and the native compression ratios and free space in the storage devices $110_C$ and $100_{NC}$. The migration manager 122 may maintain storage device type information 200, including instances of information $200_C$ and $200_{NC}$ having information on the compressed and non-compressed storage devices and extent information 300 having information on I/O profile of the extents used in calculating a compression score for extents to select extents to migrate between the compressed and non-compressed storage devices.

In certain embodiments, the storage controller 102 may comprise an enterprise storage controller, such as the International Business Machines Corporation (IBM®) DS8000™ storage controller or storage controllers from other vendors. The host 100 may comprise an enterprise host system that includes an operating system such as, but not limited to, the IBM® Z/OS® operating system. (IBM, Z/OS and DS800 are registered trademarks of IBM throughout the world).

The storage manager 118, cache manager 120, and migration manager 122 may comprise program code loaded into the memory 114 and executed by one or more of the processors 112. Alternatively, some or all of the functions may be implemented as microcode or firmware in hardware devices in the storage controller 102, such as in Application Specific Integrated Circuits (ASICs) and Field Programmable Gate Array (FPGA).

The storage 108 may comprise storage devices $110_C$, $110_{NC}$, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices $110_{NC}$ and $110_C$ may further be configured into separate compressed and non-compressed arrays, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

In described embodiments, the compressed storage devices $110_C$ implement native compression within the controller of the storage device $110_C$ to compress data as it is written to the storage media in the storage device $110_C$ and decompress data as it is read from the storage media in the storage device $110_C$. The non-compressed storage devices $110_{NC}$ may not have any native compression capabilities or have native compression capabilities but are configured to store data uncompressed.

The memory 114 may comprise a suitable volatile or non-volatile memory devices, including those described above.

The network 104 may comprise a Storage Area Network (SAN), a Local Area Network (LAN), a Wide Area Network (WAN), the Internet, and Intranet, etc.

FIG. 2 illustrates an embodiment of an instance of storage device type information 200; for a group of a type of storage devices, such as compressed storage devices $110_C$ and non-compressed storage devices $110_{NC}$. In one embodiment, the storage device type information 200; may be for all storage devices of a type, e.g., compressed and non-compressed, or may be for an array or group, such as a rank, of storage devices of a particular type. The storage device type information 200; includes: indication of storage devices 204 for which the information is provided, such as all storage devices of a type, e.g., compressed versus not compressed, or a group or array of storage devices, such as a rank, that provide storage for a logical volume 106; current available storage capacity 206 at the storage devices 204; prior interval available storage capacity 208 at the storage devices 204 at the last time interval or measurement period; rate of storage capacity consumption 210, indicating a rate at which storage capacity is depleted; and a time to deplete the storage capacity 212.

In implementations where storage device type information 200; is provided for an array of a storage device type, such as a rank of compressed storage devices or a rank of non-compressed storage devices, there may be an instance of storage device type information 200; for each group, e.g., rank, of the storage device type.

FIG. 3 illustrates an embodiment of an instance of extent information 300; for an extent of data in the volumes 106, and includes: an extent identifier (ID) 302; I/O statistics 304 for the extent, including number of writes to the extent for a time interval, number of reads to the extent, etc.; a volume I/O priority 306 indicating a volume I/O priority level for the volume 106 including the extent 302; a compression score 308 last calculated for the extent 302; and the storage device type 310, e.g., compressed storage devices $110_C$ and non-compressed storage devices $110_{NC}$. The compression score 308 is based on the profile of data in the extent, such as frequency of access and I/O priority level of the data, as well as factors on the storage devices, to determine the suitability of the extent 302 for compressed or non-compressed storage devices. For instance, an extent that has a high access frequency and/or high I/O priority level would not be suited for compressed storage devices $110_C$ because compressed storage devices $110_C$ have lower performance than non-compressed storage devices $110_{NC}$, because of the latency due to compression and decompression operations. However, for extents that have a low I/O priority and/or less frequently accessed, compressed storage devices $110_C$ are suitable because such extents do not require high performance, so they may be stored more efficiently in compressed storage devices $110_C$.

Figure 4:
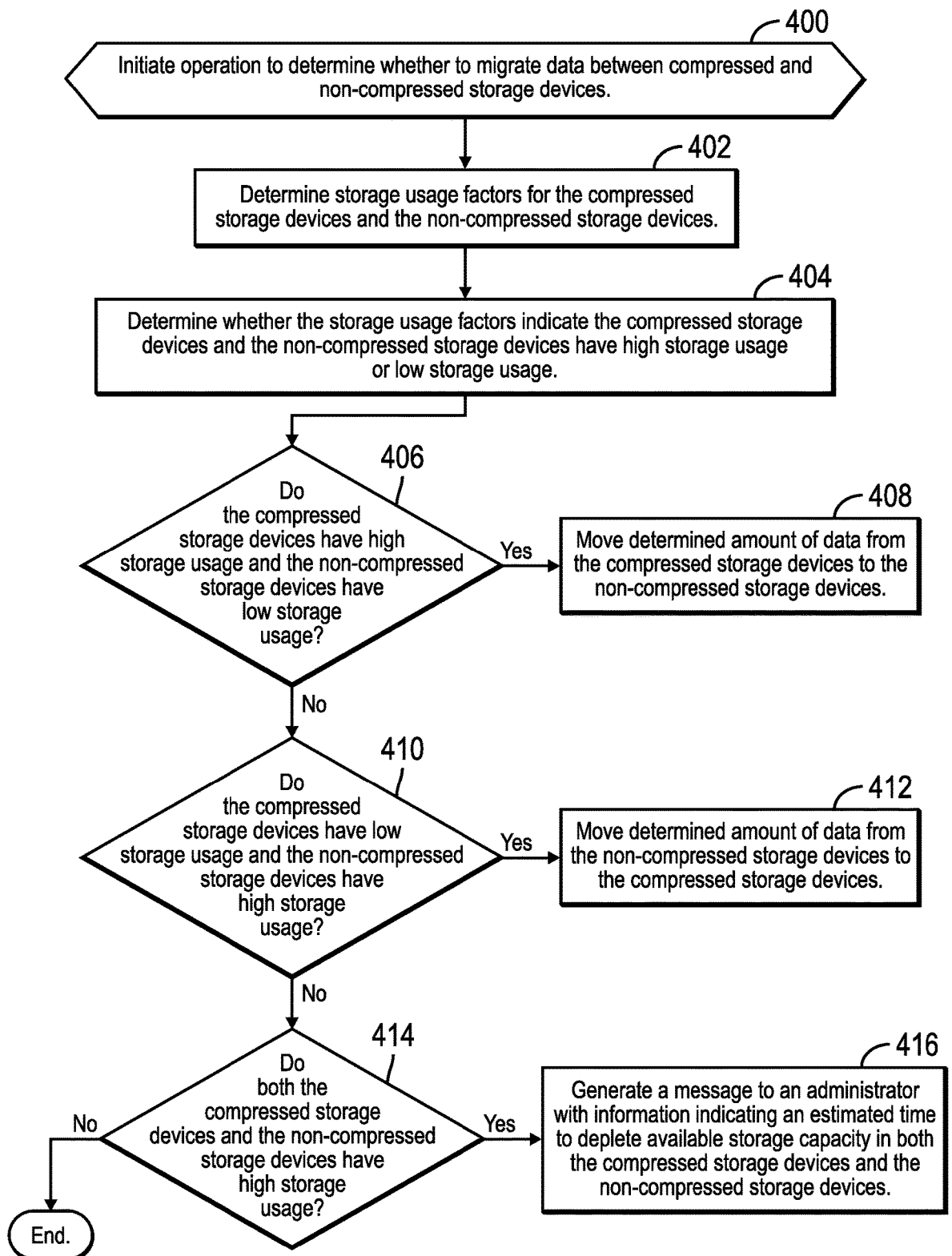
FIGS. 4 and 5 illustrate different embodiments of operations to determine to migrate data between compressed storage devices and non-compressed storage devices.

FIG. 4 illustrates an embodiment of operations performed by the migration manager 122 to determine whether to migrate data, such as extents, between the compressed storage devices $110_C$ and the non-compressed storage devices $110_{NC}$. Upon initiating (at block 400) the operation, the migration manager 122 determines (at block 402) storage usage factors for the compressed storage devices $110_C$ and the non-compressed storage devices $110_{NC}$, such as how much usage or how much time remaining on the storage devices, or group of storage devices, e.g., rank. A determination is made (at block 404) whether the storage usage factors indicate the compressed storage devices $110_C$ and the non-compressed storage $110_{NC}$ devices have high storage usage or low storage usage. If (at block 406) the compressed storage devices $110_C$ have high storage usage and the non-compressed storage devices $110_{NC}$ have low storage usage, them a determined amount of data is moved (at block 408) from the compressed storage devices $110_C$ to the non-compressed storage devices $110_{NC}$.

If (at block, 406) the condition is not satisfied and if (at block 410) the compressed storage devices $110_C$ have low storage usage and the non-compressed storage devices $110_{NC}$ have high storage usage, them a determined amount of data is moved (at block 412) from the non-compressed storage devices $110_{NC}$ to the compressed storage devices $110_C$. If (at block, 410) the condition is not satisfied and if (at block 414) both the compressed storage devices $110_C$ and the non-compressed storage devices $110_{NC}$ have high storage usage, them the migration manager 122 generates (at block 416) a message to an administrator with information indicating an estimated time to deplete available storage capacity in both the compressed storage devices and the non-compressed storage devices. This information allows the administrator to determine whether to provision or obtain more storage resources.

With the embodiment of FIG. 4, a migration manager 122 determines whether a certain type of storage device has high storage usage while the other type of storage device has low storage usage to warrant migrating data from the type of storage device, e.g., compressed or non-compressed, having a high storage usage to another type of storage device experiencing low usage to load balance the storage utilization and optimize storage usage.

Figure 5:
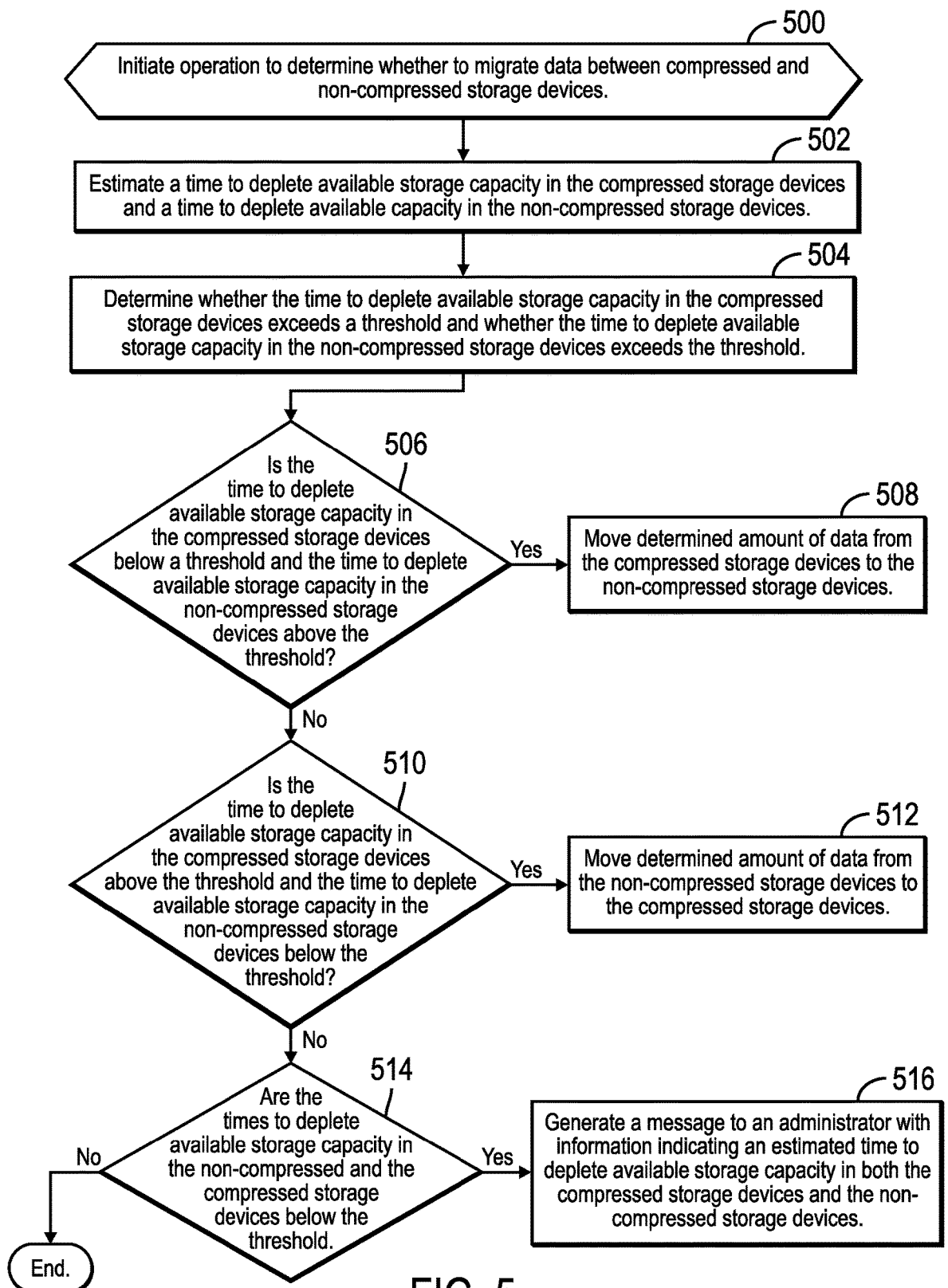

FIG. 5 illustrates an alternative embodiment of operations for the migration manager 122 to determine whether to migrate data between the compressed storage devices $110_C$ and the non-compressed storage devices $110_{NC}$, where the storage usage factor comprises an estimated time to deplete available storage capacity in a storage device type, e.g., compressed or non-compressed. Upon initiating (at block 500) operations to migrate data between storage device types, the migration manager 122 estimates (at block 502) a time to deplete available storage capacity 212 in the compressed storage devices $110_C$ and a time to deplete available capacity 212 in the non-compressed storage devices $110_{NC}$, which is indicated in the storage device type information 200; for the compressed and non-compressed storage devices 202 for which the information 200; is provided. A determination is also made (at block 504) whether the time to deplete available storage capacity 212 in the compressed storage devices $110_C$ exceeds a threshold and whether the time to deplete available storage capacity in the non-compressed storage devices $110_{NC}$ exceeds the threshold.

If (at block 506) the time to deplete available storage capacity 212 in the compressed storage devices $110_C$ is below a threshold and the time to deplete available storage capacity in the non-compressed storage devices $110_{NC}$ is above the threshold, then the migration manager 122 moves (at block 508) a determined amount of data from the compressed storage devices $110_C$ to the non-compressed storage devices $110_{NC}$. The determined amount of data may comprise an amount determined by another process or a fixed amount. If the conditions of block 508 are not satisfied and if (at block 510) the time to deplete available storage capacity 212 in the compressed storage devices $110_C$ is above the threshold and the time to deplete available storage capacity 212 in the non-compressed storage devices $110_{NC}$ is below the threshold, then the migration manager 122 moves (at block 512) a determined amount of data from the non-compressed storage devices $110_{NC}$ to the compressed storage devices $110_C$. If (at block 510) the condition in block 510 is not satisfied and if (at block 514) the times to deplete available storage capacity in the non-compressed $110_{NC}$ and the compressed $110_C$ storage devices is below the threshold, then the migration manager 122 generates (at block 516) a message to an administrator with information indicating an estimated time to deplete available storage capacity in both the compressed storage devices and the non-compressed storage devices. This information allows the administrator to determine whether to provision or obtain more storage resources.

With the embodiment of FIG. 5, the migration manager 122 considers the time to deplete available storage capacity for the storage device types being considered to determine how much longer the storage devices of the type can be available to receive data. If storage devices of a particular type, such as a rank or group of compressed or non-compressed storage devices, is overused or is likely to deplete available capacity relatively sooner than other types of storage devices, then data can be migrated from those storage device types or groups whose time to deplete storage capacity is less than others. This allows load balancing of storage based on the remaining time to deplete storage capacity so storage device types can equalize their time to deplete storage capacity among groups of different storage device types.

In the embodiment of FIGS. 4 and 5, the determinations of whether to migrate data between compressed storage devices $110_C$ and non-compressed storage devices $110_{NC}$ may consider all of the compressed storage devices $110_C$ and non-compressed storage devices $110_{NC}$ together. In a further embodiment, there may be multiple groups, or ranks, of compressed storage devices $110_C$ and multiple groups or ranks of non-compressed storage devices $110_{NC}$, so that the determination of whether to migrate in FIGS. 4 and 5 is made with respect to each group or rank of compressed storage devices $110_C$ and non-compressed storage devices $110_{NC}$.

Figure 6:
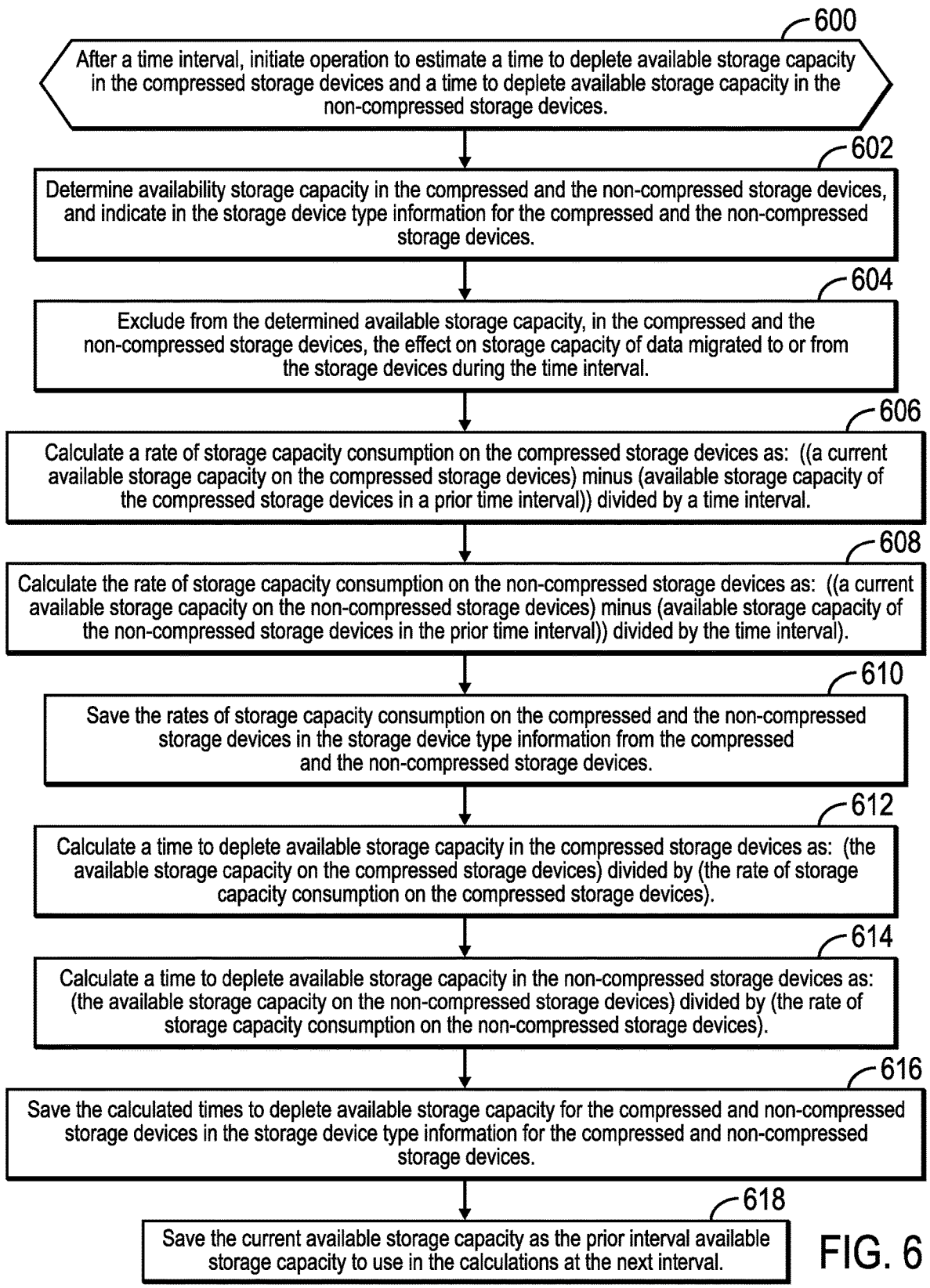
FIG. 6 illustrates an embodiment of operation to calculate times to deplete available storage capacity on the compressed storage devices and the non-compressed storage devices.

FIG. 6 illustrates an embodiment of operations to calculate the time to deplete storage capacity 212, considered in the operations of FIG. 5. After a time interval, the migration manager 122 initiates (at block 600) an operation to estimate a time to deplete available storage capacity 212 in the compressed storage devices $110_C$ and a time to deplete available storage capacity 212 in the non-compressed storage devices $110_{NC}$. comprises. The migration manager 122 determines (at block 602) availability storage capacity 206 in the compressed $110_C$ and the non-compressed $110_{NC}$ storage devices, and indicates in field 206 of the storage device type information $200_C$, $200_{NC}$, for the compressed and non-compressed storage devices, respectively. The available storage capacity on the compressed storage devices $110_C$ may comprise the available storage space times the compression ratio. When calculating available storage capacity, the migration manager may exclude (at block 604) from the determined available storage compacity, in the compressed and the non-compressed storage devices, the effect on storage capacity of data migrated to or from the storage devices during the time interval.

The migration manager 122 may then calculate (at bock 606) a rate of storage capacity consumption 210 on the compressed storage devices $110_C$ as: ((a current available storage capacity on the compressed storage devices) minus (available storage capacity of the compressed storage devices in a prior time interval)) divided by the time interval.

The rate of storage capacity consumption 210 on the non-compressed storage devices $110_{NC}$ is calculated (at block 608) as: ((a current available storage capacity on the non-compressed storage devices) minus (available storage capacity of the non-compressed storage devices in the prior time interval)) divided by the time interval. The calculated rates of storage capacity consumption on the compressed and the non-compressed storage devices are saved (at block 610) in field 210 of the storage device type information instances $200_C$, $200_{NC}$ for the compressed $110_C$ and the non-compressed storage devices $110_{NC}$, respectively.

The migration manager 122 calculates (at block 612) a time to deplete available storage capacity 212 in the compressed storage devices $110_C$ as: (the available storage capacity on the compressed storage devices) divided by (the rate of storage capacity consumption on the compressed storage devices). A time to deplete available storage capacity 212 in the non-compressed storage devices $110_{NC}$ is calculated (at block 614) as: (the available storage capacity on the non-compressed storage devices) divided by (the rate of storage capacity consumption on the non-compressed storage devices). The calculated times to deplete available storage capacity for the compressed and non-compressed storage devices are saved in field 212 of storage device type information instances $200_C$, $200_{NC}$ for the compressed and non-compressed storage devices, respectively. The current available storage capacity is saved (at block 618) as the current available storage capacity in field 208 of the storage device type information instances $200_C$, $200_{NC}$ for the compressed and non-compressed storage device types to be available as the prior interval available storage capacity 208 in the calculation after the next interval time.

Figure 7:
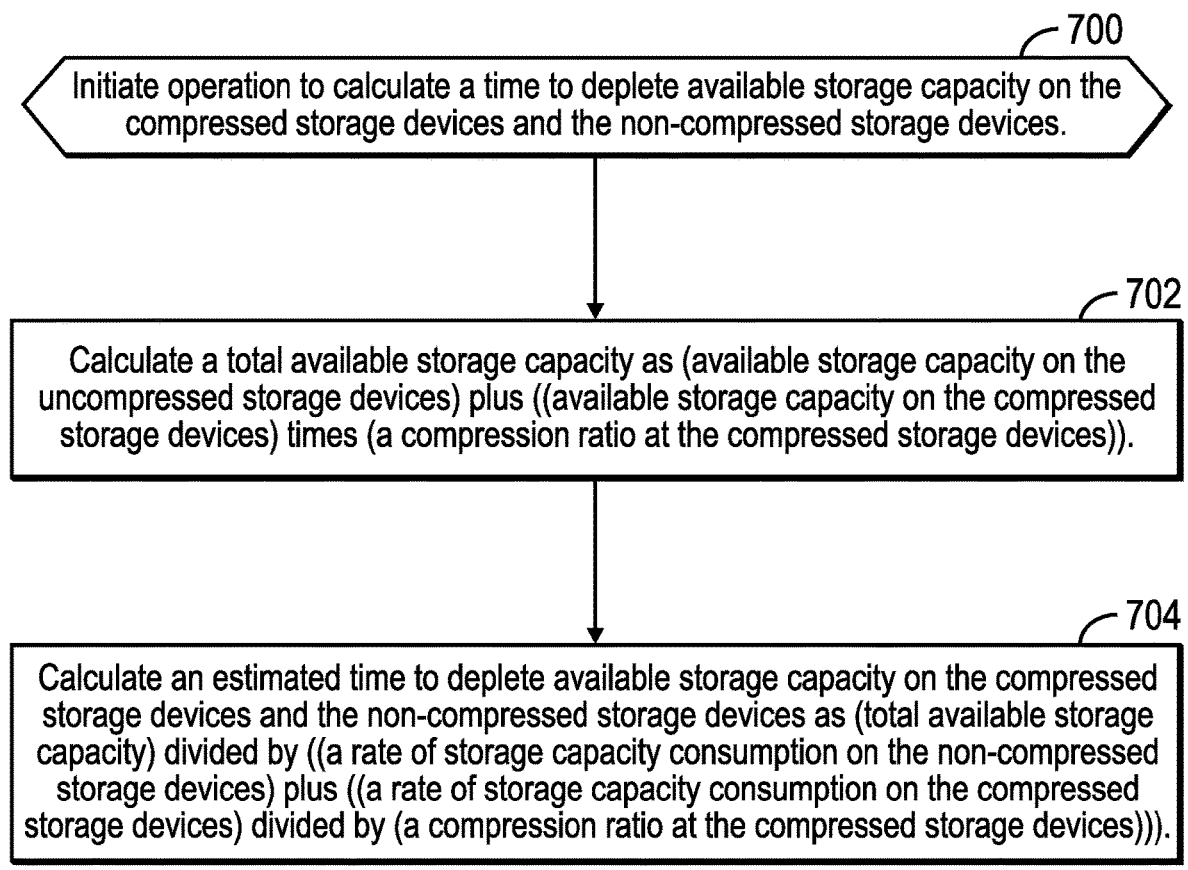
FIG. 7 illustrates an embodiment of operations to calculate a time to deplete available storage capacity on the compressed and the non-compressed storage devices.

FIG. 7 illustrates an embodiment of operations performed by the migration manager 122 to calculate a time to deplete available storage capacity on the compressed and non-compressed storage devices, such performed at blocks 416 and 516 in FIGS. 4 and 5, respectively, to report to the administrator to take further action. Upon initiating (at block 700) the operation to compute, the migration manager 122 calculates (at block 702) a total available storage capacity as (available storage capacity on the uncompressed storage devices) plus ((available storage capacity on the compressed storage devices) times (a compression ratio at the compressed storage devices)). Thus, the available storage capacity for the compressed storage devices $110_C$ takes into account the compression ratio. The migration manager 122 calculates (at block 704) an estimated time to deplete available storage capacity on the compressed storage devices and the non-compressed storage devices as: (total available storage capacity) divided by ((a rate of storage capacity consumption on the non-compressed storage devices) plus ((a rate of storage capacity consumption on the compressed storage devices) divided by (a compression ratio at the compressed storage devices))). The rate of storage capacity consumption used in these equations may come from field 210 in the storage device type information instances $200_C$, $200_{NC}$ for the compressed $110_C$ and non-compressed $110_{NC}$ storage devices.

Figure 8:
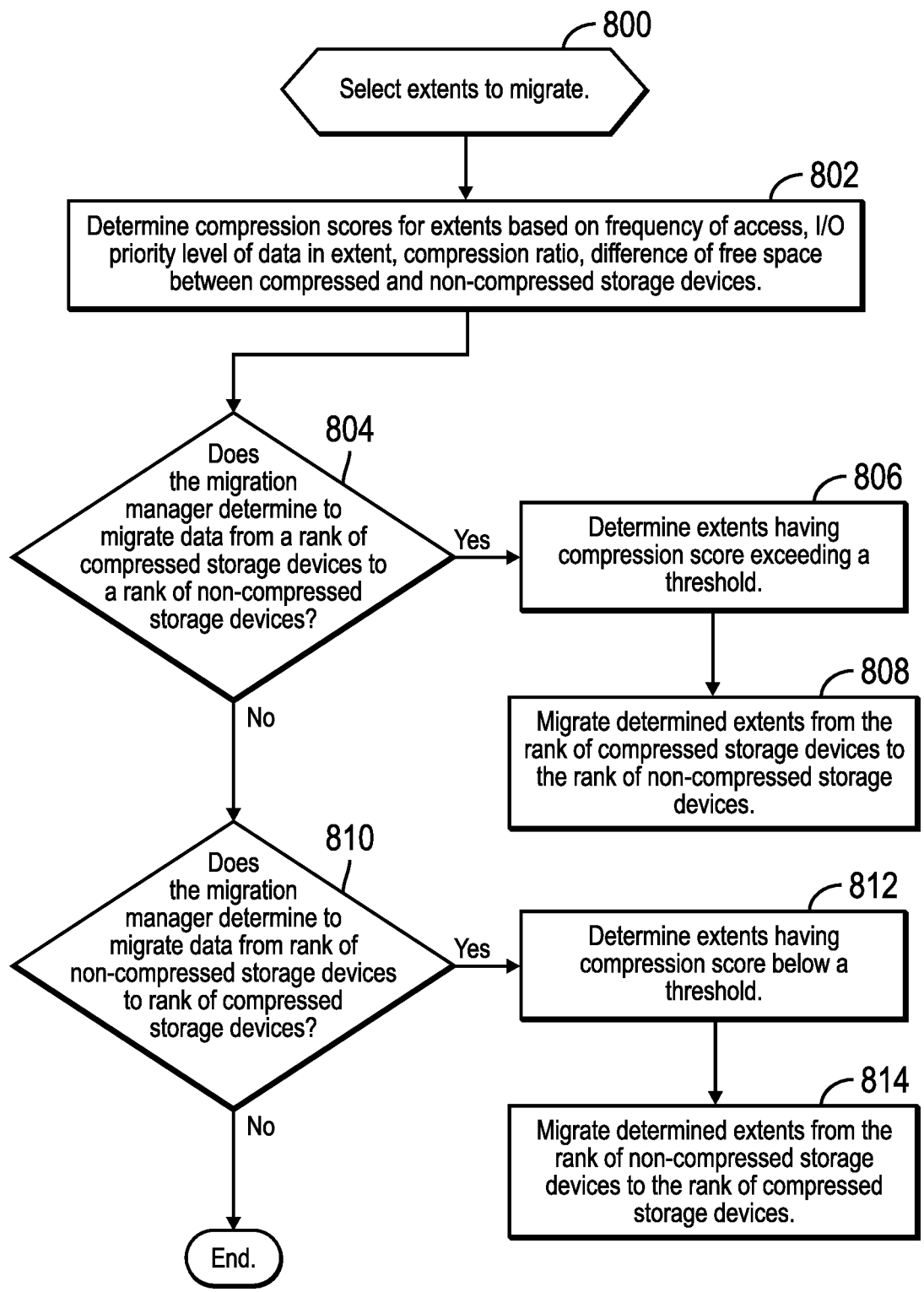
FIG. 8 illustrates an embodiment of operations to select extents to migrate.

FIG. 8 illustrates an embodiment of operations performed by the migration manager 122 to select the extents to migrate when determining to migrate data between compressed storage devices $110_C$ and non-compressed storage devices $110_{NC}$. Upon initiating (at block 800) the operations to select data, or extents to migrate, the migration manager 122 determines (at block 802) compression scores for extents, from information in the extent information 300; instances of the extents, based on frequency of I/O access in the I/O statistics 304, volume I/O priority 306 of volume 106 including the extent, level of data in extent, compression ratio, difference of free space between compressed $110_C$ and non-compressed storage devices $110_{NC}$.

In one embodiment, the compression score may be calculated by applying weights to component values based on I/O statistics, priority, compression ratio and free space, and then summing the component values. The migration manager 122 may calculate a read component value as ((number of reads in a time interval to extent) times a Read Weight)/(average reads to extents in the system). The migration manager 122 may calculate a write component value as ((number of writes in the time interval to extent) times a Write Weight)/(average writes to extents in the system). The migration manager 122 may calculate a compression component as the (compression ratio times the Compression weight) and may calculate an I/O priority component value as (Volume I/O Priority for extent)*I/O priority Weight. The migration manager 122 may also calculate a free space component value as (Free Space on non-compression storage devices)-(Free space on compression storage devices) *Free Space Weight. The weights may comprise user set values indicating an importance of the different component values. The migration manager 122 may then calculate the extent compression score as the previously calculated read component value plus write component value plus I/O priority component value plus determined free space component value minus expected compression ratio.

If (at block 804) the migration manager 122 determines to migrate data from a rank of compressed storage devices $110_C$ to a rank of non-compressed storage devices $110_{NC}$, then the migration manager 122 determines (at block 806) extents in the rank of the compressed storage devices having a compression score exceeding a threshold and migrates (at block 808) the determined extents from the rank of compressed storage devices to the rank of non-compressed storage devices.

If (at block 804) the condition is not satisfied and if (at block 810) the migration manager 122 determines to migrate data from a rank of non-compressed storage devices $110_{NC}$ to a rank of compressed storage devices $110_C$, then the migration manager 122 determines (at block 812) extents in the rank of non-compressed storage devices having a compression score below the threshold and migrates (at block 808) the determined extents from the rank of non-compressed storage devices to the rank of compressed storage devices.

With the described embodiments, a compression score is calculated based on factors related to a type of storage device most suitable for the data in the extent, such as a non-compression/high performance storage device type versus a compression/low performance storage device to indicate which storage device type should be used for the extent to optimize operations with respect to the I/O profile for that extent, as well as consider factors related to the storage device type, including an aggregate or average compression ratio of the storage device types to the compression ratio in the system as a whole and free space different between the different storage device types. This compression score is then used to select extents to migrate.

In the above embodiments, heuristic algorithms are used to determine whether to move data between the compressed storage devices $110_C$ and the non-compressed storage devices $110_{NC}$. In an alternative embodiment, the migration manager 122 may include a machine learning model, utilizing machine learning algorithms, that receives as input for each of the non-compressed storage devices $110_{NC}$ and the compression storage devices $110_C$, available storage capacity, rate of storage capacity consumption, and time to deplete available storage capacity and then outputs a classification of whether to migrate from the compressed storage devices $110_C$ to the non-compressed storage devices $110_{NC}$ or from the non-compressed storage devices $110_{NC}$ to the compressed storage devices $110_C$, and the compression ratio of the compressed storage devices $110_C$. The input may further comprise input of different ranks or groups of the storage devices, so that output indicates a particular rank or group of storage devices to use in the migration.

The migration manager 122 may use machine learning and deep learning algorithms, such as decision tree learning, association rule learning, neural network, inductive programming logic, support vector machines, Bayesian network, Recurrent Neural Networks (RNN), Feedforward Neural Networks, Convolutional Neural Networks (CNN), Deep Convolutional Neural Networks (DCNNs), Generative Adversarial Network (GAN), etc. For artificial neural network program implementations, the neural network may be trained to generate indication of a storage device type on which to store the extent using backward propagation to adjust weights and biases at nodes in a hidden layer to produce their output based on the received inputs. In backward propagation used to train a neural network machine learning module, biases at nodes in the hidden layer are adjusted accordingly to produce the indication of whether to migrate specified confidence levels based on the input parameters. For instance, the input to the machine learning model may comprise, for each of the non-compressed storage devices $110_{NC}$ and the compression storage devices $110_C$, available storage capacity, rate of storage capacity consumption, and time to deplete available storage capacity and then outputs a classification of whether to migrate from the compressed storage devices $110_C$ to the non-compressed storage devices $110_{NC}$ or from the non-compressed storage devices $110_{NC}$ to the compressed storage devices $110_C$, and the compression ratio of the compressed storage devices $110_C$ frequency of reads and writes to the extents, compression ratios for the different storage device types, volume I/O priority for volume including the extent and free space for the different storage device types and the machine learning model may produce a classification of whether to migrate and the direction of migration from compressed storage devices $110_C$ to non-compressed storage devices $110_{NC}$ type with confidence levels based on the inputs. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 9:
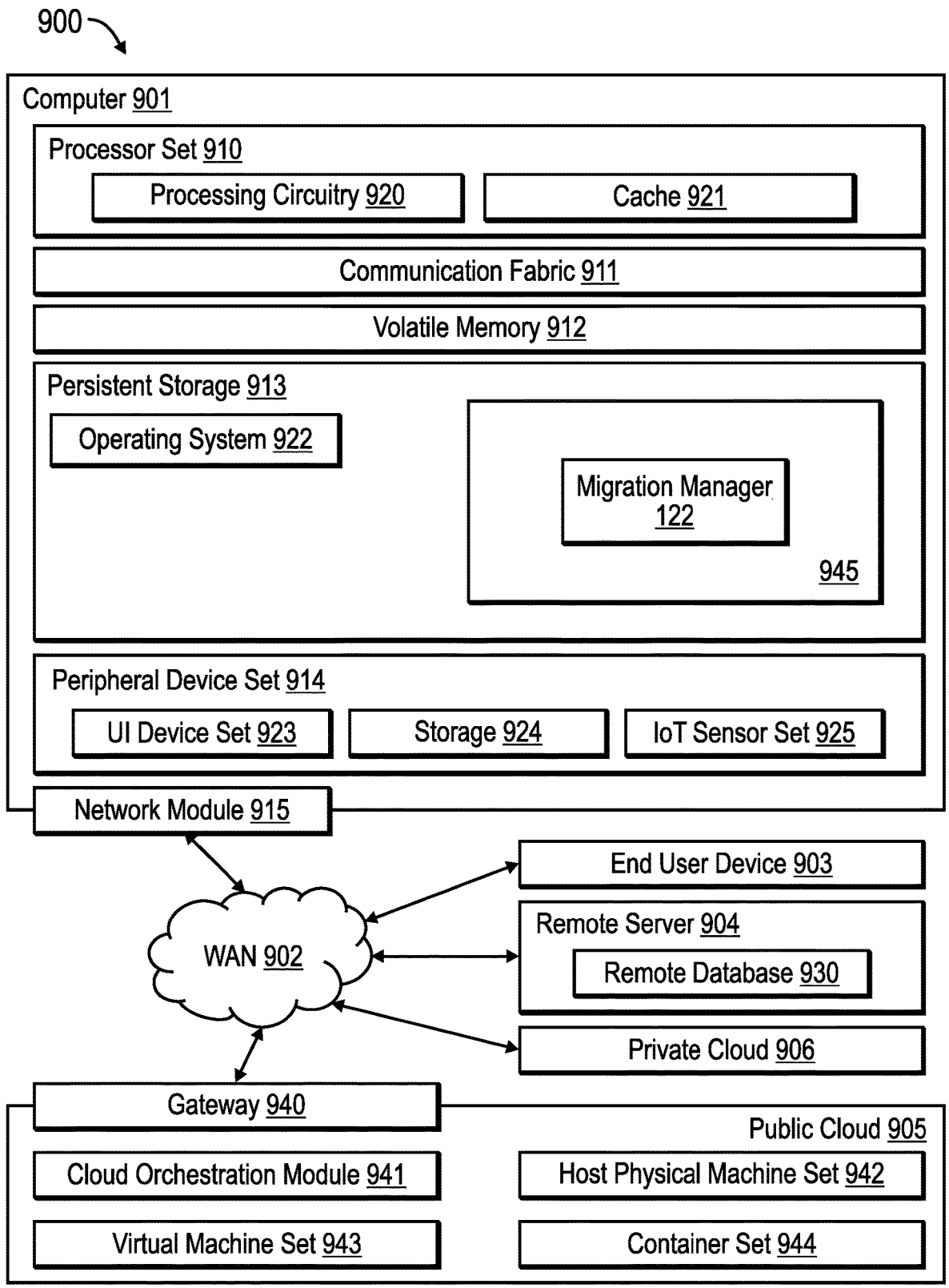
FIG. 9 illustrates a computing environment in which the components of FIG. 1 may be implemented.

With respect to FIG. 9, computing environment 900 contains an example of an environment for the execution of at least some of the computer code involved in performing the inventive methods, including the migration manager 122, described with respect to FIG. 1 above, to determine whether to migrate data between compressed and non-compressed storage devices, in block 945. In addition to block 945, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 945, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 945 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid-state storage devices. Operating system 922 may take several forms, such as various known proprietary operating systems or open source Portable Operating System Interface-type operating systems that employ a kernel. The code included in block 945 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on. The hosts 100 of FIG. 1 may comprise the EUD 903.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The letter designators, such as i, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for migrating data in a storage system, the computer program product comprising a computer readable storage medium having computer readable program code embodied therein that when executed performs:
   providing, in the storage system, a compressed storage and a non-compressed storage;
   determining a first estimated time to deplete available storage capacity on the compressed storage and determining a second estimated time to deplete available storage capacity on the non-compressed storage, wherein the first estimated time is calculated using a compression ratio at the compressed storage;
   determining one of (1) to move data from the compressed storage to the non-compressed storage and (2) to move the data from the non-compressed storage to the compressed storage based on the first estimated time and the second estimated time; and
   moving the data from the compressed storage to the non-compressed storage in response to determining to move the data from the compressed storage to the non-compressed storage; and
   moving the data from the non-compressed storage to the compressed storage in response to determining to move the data from the non-compressed storage to the compressed storage.

2. The computer program product of claim 1, wherein the determining whether to move the data and the moving the data between the compressed storage and the non-compressed storage comprises:
   determining whether the first estimated time exceeds a threshold and whether the second estimated time exceeds the threshold,
   wherein the determining to move the data from the compressed storage to the non-compressed storage is made in response to the first estimated time is below the threshold and the second estimated time is above the threshold, and
   wherein the determining to move the data from the non-compressed storage to the compressed storage is made in response to the second estimated time is below the threshold and the first estimated time is above the threshold.

3. The computer program product of claim 1, wherein the operations further comprise:
   determining whether the first estimated time exceeds a threshold and whether the second estimated time exceeds the threshold; and
   reporting to an administrator information indicating the first estimated time and the second estimated time in response to the determining the second estimated time is below the threshold and the first estimated time is below the threshold.

4. The computer program product of claim 1, wherein the determining the first estimated time comprises:
   determining a rate of storage capacity consumption on the compressed storage and the first estimated time further comprises (available storage capacity on the compressed storage) divided by (the rate of storage capacity consumption on the compressed storage); and wherein the determining the second estimated time comprises:
   determining a rate of storage capacity consumption on the non-compressed storage and the second estimated time further comprises (available storage capacity on the non-compressed storage) divided by (the rate of storage capacity consumption on the non-compressed storage).

5. The computer program product of claim 4, wherein the determining the rate of storage capacity consumption on the compressed storage comprises ((a current available storage capacity on the compressed storage) minus (available storage capacity of the compressed storage in a prior time interval)) divided by a time interval, and wherein the determining the rate of storage capacity consumption on the non-compressed storage comprises ((a current available storage capacity on the non-compressed storage) minus (available storage capacity of the non-compressed storage in the prior time interval)) divided by the time interval.

6. The computer program product of claim 5, wherein the current available storage capacity on the compressed storage excludes data migrated to or from the compressed storage since the prior time interval, and wherein the current available storage capacity on the non-compressed storage excludes data migrated to or from the non-compressed storage since the prior time interval.

7. The computer program product of claim 1, wherein the operations further comprise:
   determining total available storage capacity as (available storage capacity on the non-compressed storage) plus ((available storage capacity on the compressed storage) times (a compression ratio at the compressed storage)), wherein determining a total estimated time comprises determining (total available storage capacity) divided by ((a rate of storage capacity consumption on the non-compressed storage) plus ((a rate of storage capacity consumption on the compressed storage) divided by (a compression ratio at the compressed storage))); and
   reporting the total estimated time in response to determining not to move data between the compressed storage and the non-compressed storage.

8. The computer program product of claim 1, wherein the operations further comprise:
   determining compression scores for extents based in frequency of access, I/O priority level of data in extent, compression ratio, difference of free space between compressed and non-compressed storage;
   in response to determining to migrate data from the compressed storage to the non-compressed storage, determining a number of extents having compression score above a threshold, wherein the determined number of extents are migrated from the compressed storage to the non-compressed storage; and
   in response to determining to migrate data from the non-compressed storage to the compressed storage, determining a number of extents having compression score below the threshold, wherein the determined number of extents are migrated from the non-compressed storage to the compressed storage.

9. The computer program product of claim 1, wherein the operations further comprise:

reporting the first estimated time and the second estimated time in response to determining not to move the data between the compressed storage and the non-compressed storage.

10. A system for migrating data, comprising:
a processor; and
a computer readable storage medium having computer readable program code embodied therein that when executed performs:
providing a compressed storage and a non-compressed storage;
determining a first estimated time to deplete available storage capacity on the compressed storage and determining a second estimated time to deplete available storage capacity on the non-compressed storage, wherein the first estimated time is calculated using a compression ratio at the compressed storage;
determining one of (1) to move data from the compressed storage and the non-compressed storage and (2) to move the data from the non-compressed storage to the compressed storage based on the first estimated time and the second estimated time; and
moving the data from the compressed storage to the non-compressed storage in response to determining to move the data from the compressed storage to the non-compressed storage; and
moving the data from the non-compressed storage to the compressed storage in response to determining to move the data from the non-compressed storage to the compressed storage.

11. The system of claim 10, wherein the determining whether to move the data and the moving the data between the compressed storage and the non-compressed storage comprises:
determining whether the first estimated time exceeds a threshold and whether the second estimated time exceeds the threshold,
wherein the determining to move the data from the compressed storage to the non-compressed storage is made in response to the first estimated time is below the threshold and the second estimated time is above the threshold, and
wherein the determining to move the data from the non-compressed storage to the compressed storage is made in response to the second estimated time is below the threshold and the first estimated time is above the threshold.

12. The system of claim 10, wherein the determining the first estimated time comprises:
determining a rate of storage capacity consumption on the compressed storage and the first estimated time further comprises (available storage capacity on the compressed storage) divided by (the rate of storage capacity consumption on the compressed storage); and wherein the determining the second estimated time comprises:
determining a rate of storage capacity consumption on the non-compressed storage and the second estimated time further comprises (available storage capacity on the non-compressed storage) divided by (the rate of storage capacity consumption on the non-compressed storage).

13. The system of claim 12, wherein the determining the rate of storage capacity consumption on the compressed storage comprises ((a current available storage capacity on the compressed storage) minus (available storage capacity of the compressed storage in a prior time interval)) divided by a time interval, and wherein the determining the rate of storage capacity consumption on the non-compressed storage comprises ((a current available storage capacity on the non-compressed storage) minus (available storage capacity of the non-compressed storage in the prior time interval)) divided by the time interval.

14. The system of claim 10, wherein the operations further comprise:
reporting the first estimated time and the second estimated time in response to determining not to move the data between the compressed storage and the non-compressed storage.

15. The system of claim 10, wherein the operations further comprise:
determining whether the first estimated time exceeds a threshold and whether the second estimated time exceeds the threshold; and
reporting to an administrator information indicating the first estimated time and the second estimated time in response to the determining the second estimated time is below the threshold and the first estimated time is below the threshold.

16. The system of claim 10, wherein the operations further comprise:
determining total available storage capacity as (available storage capacity on the non-compressed storage) plus ((available storage capacity on the compressed storage) times (a compression ratio at the compressed storage)), wherein a total estimated time comprises determining (total available storage capacity) divided by ((a rate of storage capacity consumption on the non-compressed storage) plus ((a rate of storage capacity consumption on the compressed storage) divided by (a compression ratio at the compressed storage))); and
reporting the total estimated time in response to determining not to move data between the compressed storage and the non-compressed storage.

17. A method for migrating data in a storage system, comprising:
providing, in the storage system, compressed storage and a non-compressed storage;
determining a first estimated time to deplete available storage capacity on the compressed storage and determining a second estimated time to deplete available storage capacity on the non-compressed storage, wherein the first estimated time is calculated using a compression ratio at the compressed storage;
determining one of (1) to move data from the compressed storage to the non-compressed storage and (2) to move the data from the non-compressed storage to the compressed storage based on the first estimated time and the second estimated time; and
moving the data from the compressed storage to the non-compressed storage in response to determining to move the data from the compressed storage to the non-compressed storage; and
moving the data from the non-compressed storage to the compressed storage in response to determining to move the data from the non-compressed storage to the compressed storage.

18. The method of claim 17, wherein the determining whether to move the data and the moving the data between the compressed storage and the non-compressed storage comprises:

determining whether the first estimated time exceeds a threshold and whether the second estimated time exceeds the threshold;

wherein the determining to move the data from the compressed storage to the non-compressed storage is made in response to the first estimated time is below the threshold and the second estimated time is above the threshold; and wherein the determining to move the data from the non-compressed storage to the compressed storage is made in response to the second estimated time is below the threshold and the first estimated time is above the threshold.

19. The method of claim 17, wherein the determining the first estimated time comprises:

determining a rate of storage capacity consumption on the compressed storage and the first estimated time further comprises (available storage capacity on the compressed storage) divided by (the rate of storage capacity consumption on the compressed storage); and wherein the determining the second estimated time comprises:

determining a rate of storage capacity consumption on the non-compressed storage and the second estimated time further comprises (available storage capacity on the non-compressed storage) divided by (the rate of storage capacity consumption on the non-compressed storage).

20. The method of claim 19, wherein the determining the rate of storage capacity consumption on the compressed storage comprises ((a current available storage capacity on the compressed storage) minus (available storage capacity of the compressed storage in a prior time interval)) divided by a time interval, and wherein the determining the rate of storage capacity consumption on the non-compressed storage comprises ((a current available storage capacity on the non-compressed storage) minus (available storage capacity of the non-compressed storage in the prior time interval)) divided by the time interval.

21. The method of claim 17, further comprising:

reporting the first estimated time and the second estimated time in response to determining not to move the data between the compressed storage and the non-compressed storage.

22. The method of claim 17, further comprising:

determining whether the first estimated time exceeds a threshold and whether the second estimated time exceeds the threshold; and reporting to an administrator information indicating the first estimated time and the second estimated time in response to the determining the second estimated time is below the threshold and the first estimated time is below the threshold.

23. The method of claim 17, further comprising:

determining total available storage capacity as (available storage capacity on the non-compressed storage) plus ((available storage capacity on the compressed storage) times (a compression ratio at the compressed storage)), wherein determining a total estimated time comprises determining (total available storage capacity) divided by ((a rate of storage capacity consumption on the non-compressed storage) plus ((a rate of storage capacity consumption on the compressed storage) divided by (a compression ratio at the compressed storage); and reporting the total estimated time in response to determining not to move data between the compressed storage and the non-compressed storage.

* * * * *